United States Patent
Duck et al.

(10) Patent No.: US 7,337,920 B2
(45) Date of Patent: Mar. 4, 2008

(54) FLUID DISPENSING APPARATUS

(75) Inventors: Michael R Duck, Middle Sackville (CA); Garth C. Illsley, Kentville (CA); Charles Jollymore, Upper Sackville (CA); Ian MacLean, Bridgewater (CA); Kevin Stoneman, Lower Sackville (CA); Dzung Tran, Hammonds Plains (CA); Avery Wilson, Middle Sackville (CA); Kim Kanigan, Stillwater Lake (CA)

(73) Assignee: A.C. Dispensing Equipment, Inc., Lower Sackville, Nova Scotia (CA)

( * ) Notice: Subject to any disclaimer, the term of this patent is extended or adjusted under 35 U.S.C. 154(b) by 559 days.

(21) Appl. No.: 10/830,033

(22) Filed: Apr. 23, 2004

(65) Prior Publication Data

US 2005/0236429 A1    Oct. 27, 2005

(51) Int. Cl.
| B67D 5/008 | (2006.01) |
| B67D 5/056 | (2006.01) |
| B67D 5/042 | (2006.01) |
| B67D 3/00 | (2006.01) |
| F04B 49/00 | (2006.01) |

(52) U.S. Cl. ............... 222/63; 222/129.4; 222/390; 222/481.5; 417/28

(58) Field of Classification Search ............... 222/63, 222/129–129.4, 333, 390, 481.5; 417/28, 417/45, 415
See application file for complete search history.

(56) References Cited

U.S. PATENT DOCUMENTS

| 1,984,296 A * | 12/1934 | Witter ............... 222/43 |
| 3,384,268 A * | 5/1968 | Egee et al. ............... 222/1 |
| 3,586,214 A * | 6/1971 | Diebel ............... 222/129.4 |
| 4,793,524 A * | 12/1988 | Starr ............... 222/309 |
| 4,994,984 A | 2/1991 | Massimo |
| 5,027,284 A | 6/1991 | Senghaas et al. |
| 5,152,429 A * | 10/1992 | Billings ............... 222/129.2 |
| 5,284,423 A * | 2/1994 | Holdsworth et al. ........... 417/28 |
| 6,419,120 B1 | 7/2002 | Bertone |
| 6,616,014 B1 | 9/2003 | Pozniak et al. |
| 6,957,747 B2 * | 10/2005 | Peeler et al. ............... 222/1 |
| 6,968,983 B2 * | 11/2005 | Laible ............... 222/464.1 |

FOREIGN PATENT DOCUMENTS

| CA | 1048343 | 2/1979 |
| CA | 2033099 | 11/1990 |
| CA | 1303560 | 6/1992 |
| CA | 2130647 | 3/1995 |

* cited by examiner

Primary Examiner—Kevin Shaver
Assistant Examiner—M A Cartagena
(74) Attorney, Agent, or Firm—Shin Hung; Borden Ladner Gervais LLP

(57) ABSTRACT

A concentrated flavour dispensing machine having displacement pumps for delivering between a few millilitres and few ounces of fluids having a viscosity value between 1 to 4000 centepoise is described. The dispensing machine includes a cabinet for containing a multitude of displacement pumps, where each displacement pump is in direct fluid communication with a respective storage tank, and a control panel having a programmable microprocessor mounted to the cabinet for receiving user selections and controlling each individual pump. Each displacement pump includes a stepper motor in engagement with a threaded drive rod for advancing a piston by any one of several predetermined distances to dispense a corresponding volume of fluid. The control panel receives a valid user selection for actuating one or more pumps to dispense the appropriate volume of a concentrated flavouring fluid. The microprocessor tracks the amount of fluid dispensed from each storage tank and alerts users and/or prevents further operation when reservoirs are close to empty to avoid null dispenses to customers. Various maintenance routines can be executed through the user interface, and dispense volumes and combination dispenses can be re-programmed manually or automatically.

22 Claims, 11 Drawing Sheets

FLUID DISPENSING APPARATUS

FIELD OF THE INVENTION

The present invention relates generally to liquid dispensing machines. More particularly, the present invention relates to liquid dispensing machines capable of dispensing small and accurate amounts of concentrated liquids.

BACKGROUND OF THE INVENTION

Many coffee shops serve an array of coffee products, from mild to strong coffees brewed from coffee beans grown in different areas of the world, each imparting a particular flavour and aroma. Due to the limited counter space available to coffee shops, only a small selection of coffees are served each day, as coffee pots, heat plates and coffee bean grinders occupy a significant portion of the counter space. This selection can include strong, mild or medium roast coffees brewed from a variety of coffee beans.

In addition to these "standard" coffees, a selection of flavoured coffees are also served. Examples of such flavours include amaretto almond, French Vanilla and Irish cream. One method of providing flavoured coffees is to obtain flavoured coffee beans with the flavouring infused into the beans, and grinding them for brewing a pot of the flavoured coffee. Another method is to use pre-packaged, ground flavoured coffee. A third method is to is to stock a selection of flavour syrups that can be directly added to any regular cup of coffee by the server. This technique provides more flexibility since the flavour can be added to any standard coffee.

However, because separate grinders are required for grinding standard coffee beans and flavoured coffee beans to ensure that the standard coffee bean grinders are free from contamination from flavoured grounds, valuable counter space is taken up and additional cost is incurred by the extra grinder. Furthermore, flavoured coffees tend to stew in their pots for a relatively long period of time since they may not be as popular as the non-flavoured coffees. Those of skill in the art are well aware that coffee left standing on a heat plate for too long is unpalatable due to poor taste. Therefore, additional cost is incurred as unsold flavoured coffee must be thrown out in favour of freshly brewed flavoured coffee. Although use of pre-packaged flavoured coffee obviates the need for an additional grinder, the problem with limited counter space and aged coffee persists. Furthermore, the consumer perception that pre-packaged coffee cannot be as fresh as freshly ground coffee tends to curb consumers from purchasing pre-packaged, flavoured coffee.

Bottles of flavoured liquids, or syrups, are easily stored upon shelves and countertops, and a wide selection of flavours can be made available to the consumer. Unfortunately, consistency of flavour between different servings is difficult to achieve because the dose of syrup added to each cup of coffee is subject to human error. Furthermore, the optimal dose of syrup changes for different sized cups of coffee, and for different types of beverages (cappuccino, lattes, tea etc) to ensure that the flavouring is not overpowering or insufficient for the base beverage. Consistent dosing is further complicated when several flavours are added to the same beverage, as different flavours can overpower others. For example, a mint flavouring can easily overpower a vanilla flavouring of the same quantity. Hence, consistent and accurate dosing of flavourings cannot be achieved when a server is responsible for manually preparing a flavoured beverage.

Another factor for consideration is the concentrated flavouring itself. Manufacturers and retailers prefer to use concentrated flavouring with minimal carrier, as the carrier can affect the flavouring and taste of the flavoured beverage, and the additional volume contributed by the carrier increases shipping costs of the flavouring. Thus, the highly concentrated flavouring to be added can be in the order of several millilitres, depending on the type and size of beverage. Due to the highly concentrated nature of the concentrated flavouring, accuracy of the dispense becomes critical since the absence or addition of one or two millilitres can significantly affect the taste of the beverage.

Known dispensing machines include simple gravity fed valves, peristaltic pumps, pressurized systems and displacement pumps, for dispensing fluids. However, none of these types of machines are suitable for dispensing the very small volumes of concentrated flavouring fluid desired by the industry.

Gravity fed valve dispensing machines simply open and close a valve connected to a tank that releases fluid under gravity in response to a user actuating a lever or switch. Such dispensers are obviously not suitable for accurate and consistent delivery of small amounts of concentrated flavouring fluids since the amount to be dispensed relies upon user control.

Constant mechanical deformation of the flexible tube of peristaltic pump systems changes its elasticity characteristics, and hence the dose it provides over time. Furthermore, known peristaltic pump systems are not capable of dispensing very small quantities of concentrated flavouring fluids.

Current pressure based dispensing systems rely on flow meters which are not sensitive enough to the very small flows required for dispensing the small volumes of concentrated flavourings. Hence their dispensing accuracy is poor, especially since the canister pressure changes as it empties, which introduces a variation in proportions and amounts of fluid dispensed. Furthermore, these systems tend to be difficult to clean and flavours are difficult to change.

Current displacement pumps are designed for dispensing relatively large volumes of fluid, and therefore lack the precision necessary for dispensing small volumes of concentrated flavourings. Current displacement pumps are thus even less suited to dispensing small volumes of high viscosity fluids.

Furthermore, flavourings are not limited to the concentrated flavouring fluids mentioned above. Other products such as chocolate syrups, can be dispensed to create other popular beverages. The problem posed by such additives is their high viscosity rating relative to standard concentrated flavouring fluids. In particular, typical concentrated flavouring fluids have a viscosity rating of two to four centepoise, while certain syrups have centepoise values of about 4000. It is noted that 4000 centepoise fluids are thick and do not flow quickly under gravity. Thus, these products are difficult to dispense through gravity or pressure based dispensing systems. While peristaltic pump systems can be modified to accommodate 4000 centepoise fluids, the high cost renders this approach unfeasible and impractical. Examples of such impracticalities includes the requirement to change fine size to accommodate the different viscosities, and the pump bodies being configurable to accept either two small cartridges or one large cartridge. Since current displacement pumps are designed for dispensing large volumes of low centepoise fluids, they cannot dispense 4000 centepoise fluids accurately.

Hence, to minimize counter space while providing an ample selection of product to dispense, retailers require an apparatus capable of dispensing numerous types of flavourings. However, there are no known dispensers capable of dispensing concentrated flavouring fluids having a wide range of centepoise values, and in volumes of a few millilitres consistently and accurately.

It is, therefore, desirable to provide a dispensing machine for providing any number of concentrated flavourings having a wide range of centepoise values, and in small volumes with high accuracy, for various beverage bases and size combinations.

SUMMARY OF THE INVENTION

It is an object of the present invention to obviate or mitigate at least one disadvantage of previous fluid dispensing systems. In particular, it is an object of the invention to provide a fluid dispensing system for dispensing very small volumes of fluid consistently and accurately, where the fluids can have a wide range of viscosity levels.

According to a first aspect, the present invention provides a displacement pump for dispensing a predetermined volume of fluid. The displacement pump includes a cylindrical chamber, a piston, a threaded drive rod, a stepper motor, and anti-rotation means. The cylindrical chamber is coupled to a fluid dispensing outlet, and the cylindrical chamber defines an internal volume for storing at least the predetermined volume of fluid. The piston is slidable in the cylindrical chamber towards the fluid dispensing outlet. The threaded drive rod is connected to the piston. The stepper motor is coupled to the cylindrical chamber and is in threaded engagement with the threaded drive rod. The stepper motor is rotatable by a number of steps to slide the piston towards the fluid dispensing outlet by a distance corresponding to the predetermined volume of fluid. The anti-rotation means is coupled to the threaded drive rod for inhibiting rotation thereof relative to the stepper motor.

In an embodiment of the first aspect, the fluid dispensing outlet includes a first one-way check valve, the displacement pump further includes a fluid inlet coupled to the cylindrical chamber, where the fluid inlet including a second one-way check valve, and the fluid dispensing outlet and the fluid inlet are integrated within a front flange, where the front flange has a recessed portion for receiving the cylindrical chamber. According to an aspect of the present embodiment, the displacement pump further includes a storage tank having a rigid fluid conduit coupled to the fluid inlet. The storage tank can include an aperture for receiving fluid, and a tank cap for covering the aperture. The tank cap can be configured for sealing the aperture, and can further include a third one way check valve for allowing entry of air into the storage tank while preventing exit of fluid vapor from the storage tank.

In another embodiment of the first aspect, the piston includes a piston seal, and the piston seal includes a contact edge having a width to resisting bowing. In further embodiments of the first aspect, the anti-rotation means can include a guide tube having one end coupled to the cylindrical chamber and another end coupled to the stepper motor, where the guide tube houses a portion of the threaded drive rod. The anti-rotation means can further include a rod guide fixed to the threaded drive rod and slidable within the guide tube, where the rod guide matingly engages an inner surface of the guide tube to inhibit rotation of the threaded drive rod. Preferably, the guide tube has a length substantially equal to the length of the cylindrical chamber. In yet other embodiments of the first aspect, the cylindrical chamber can be constructed of acrylic, and the displacement pump can include a sensor to detect when the threaded drive rod reaches a fully withdrawn position.

In a second aspect, the present invention provides a dispensing system for providing a predetermined volume of fluid corresponding to a user selection. The dispensing system can include a user interface, a microprocessor, a pump driver, and a displacement pump. The user interface provides electrical selection signals in response to the user selection. The microprocessor receives the electrical selection signals and accesses stored displacement pump calibration data in response to the electrical selection signals. The microprocessor calculates the predetermined volume of fluid to dispense corresponding to the electrical selection signals and the stored displacement pump calibration data, for providing pump control data. The pump driver receives the pump control data and provides motor drive signals. The displacement pump includes a cylindrical chamber, a piston, a threaded drive rod, a stepper motor, and anti-rotation means. The cylindrical chamber is coupled to a fluid dispensing outlet, the cylindrical chamber defining an internal volume for storing at least the predetermined volume of fluid. The piston is slidable in the cylindrical chamber towards the fluid dispensing outlet. The threaded drive rod is connected to the piston. The stepper motor is coupled to the cylindrical chamber and in threaded engagement with the threaded drive rod. The stepper motor rotates in response to the motor drive signals by a number of steps to slide the piston towards the fluid dispensing outlet by a distance corresponding to the predetermined volume of fluid. The anti-rotation means is coupled to the threaded drive rod for inhibiting rotation thereof relative to the stepper motor.

In an embodiment of the second aspect, the user interface includes a button panel for receiving the user selection, and the button panel is arranged to represent categories of variables. The user interface can include an LCD panel and a communication port for receiving programming data. In aspects of the present embodiment, the communication port can include a wired port or a wireless port.

In another embodiment of the second aspect, the dispensing system can further include a plurality of displacement pumps, and a relay system for selectively coupling the motor drive signals to one of the plurality of displacement pumps. In yet another embodiment of the second aspect, each of the plurality of displacement pumps is coupled to a corresponding plurality of storage tanks, and the plurality of displacement pumps and the corresponding plurality of storage tanks are contained within a cabinet. In an aspect of the present embodiment, the fluid dispensing outlet of each of the plurality of displacement pumps can be coupled by a flexible tube to a nozzle cap mounted to the cabinet. In yet another aspect, the nozzle cap can include a plurality of individual channels, each individual channel being coupled to one of the flexible tubes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a dispensing machine, a displacement pump, and a method of controlling the displacement pump for metering small volumes of concentrated flavour fluids having a wide range viscosities, or centepoise values.

A concentrated flavour dispensing machine having displacement pumps for delivering between a few millilitres and few ounces of fluids having a viscosity value between 1 to 4000 centepoise is described. The dispensing machine includes a cabinet for containing a multitude of displacement pumps, where each displacement pump is in direct fluid communication with a respective storage tank, and a control panel having a programmable microprocessor mounted to the cabinet for receiving user selections and controlling each individual pump. Each displacement pump includes a stepper motor in engagement with a threaded drive rod for advancing a piston by any one of several predetermined distances to dispense a corresponding volume of fluid. The control panel receives a valid user selection for actuating one or more pumps to dispense the appropriate volume of a concentrated flavouring fluid. The microprocessor tracks the amount of fluid dispensed from each storage tank and alerts users and/or prevents further operation when reservoirs are close to empty to avoid null dispenses to customers. Various maintenance routines can be executed through the user interface, and dispense volumes and combination dispenses can be re-programmed manually or automatically.

Figure 1:
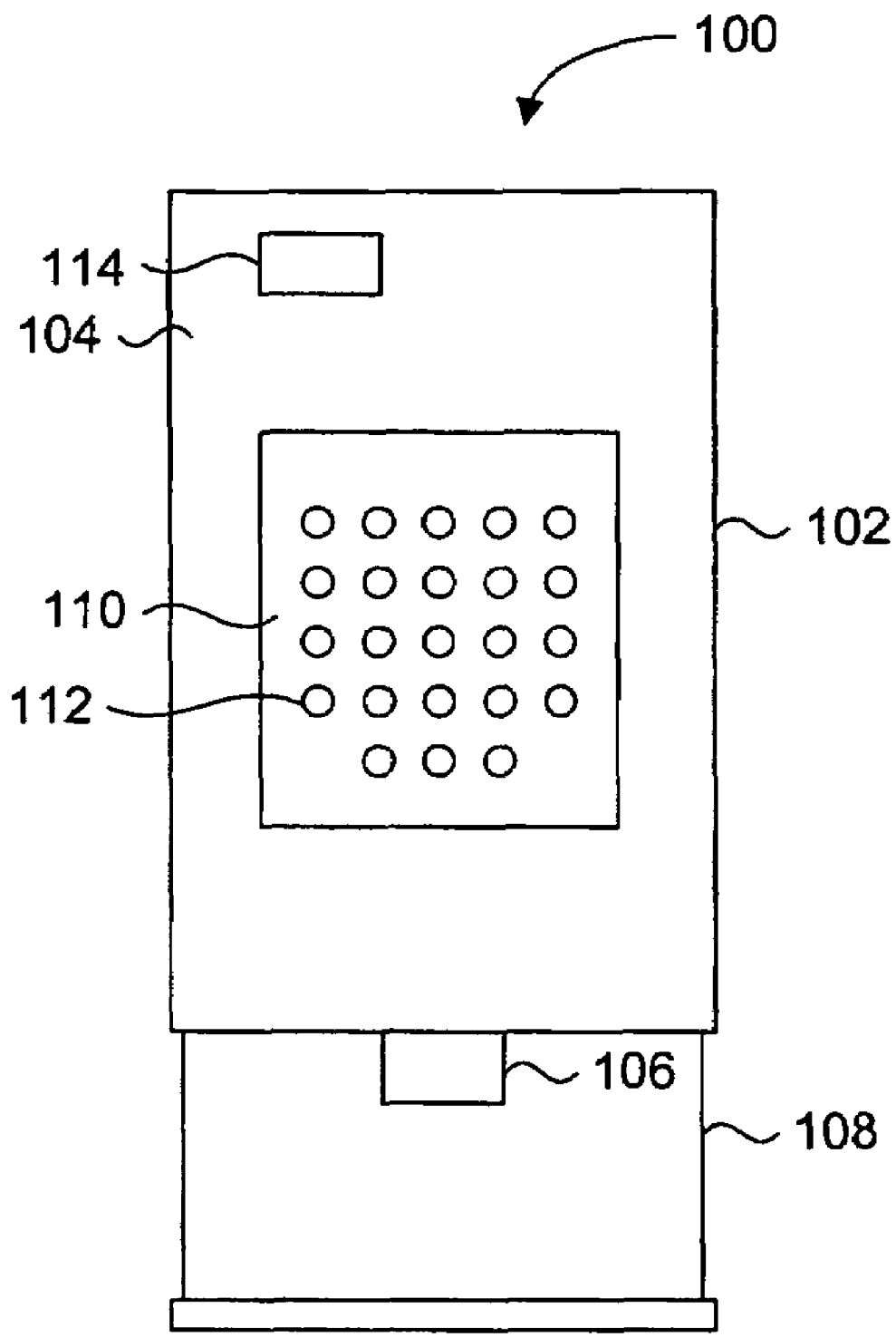
FIG. 1 is a front end view of a dispensing machine according to an embodiment of the present invention.

FIG. 1 is a front view of a dispensing machine according to an embodiment of the present invention. Dispensing machine 100 can be located behind a counter of a coffee shop or café for operation by staff members, or can be placed in a cafeteria line for use by customers. Dispensing machine 100 according to the embodiments of the present invention will dispense concentrated flavouring fluids into a container, such as a cup, mug or bowl, in response to a user selection. Depending on the user selection, a single concentrated flavouring fluid can be dispensed into the container, or a combination dispense where several concentrated flavouring fluids can be dispensed into the container.

Dispensing machine 100 includes a cabinet 102 for storing displacement pumps and reservoir tanks (not shown), a door panel 104, a nozzle cap 106, and a drip tray 108. The front of door panel 104 is hinged to cabinet 102, and includes a user interface 110 consisting of buttons 112, for a user to make their selection, and a display 114 for providing feedback to the user in the form of messages. In the present example shown in FIG. 1, the dispensing machine can dispense fluids from up to ten different pumps. The volume to be dispensed can depend on several categories of variables. These categories can include the type of base beverage, the size of the beverage, and modifier of the beverage. Within each variable category, there can be any number of choices.

Figure 4:
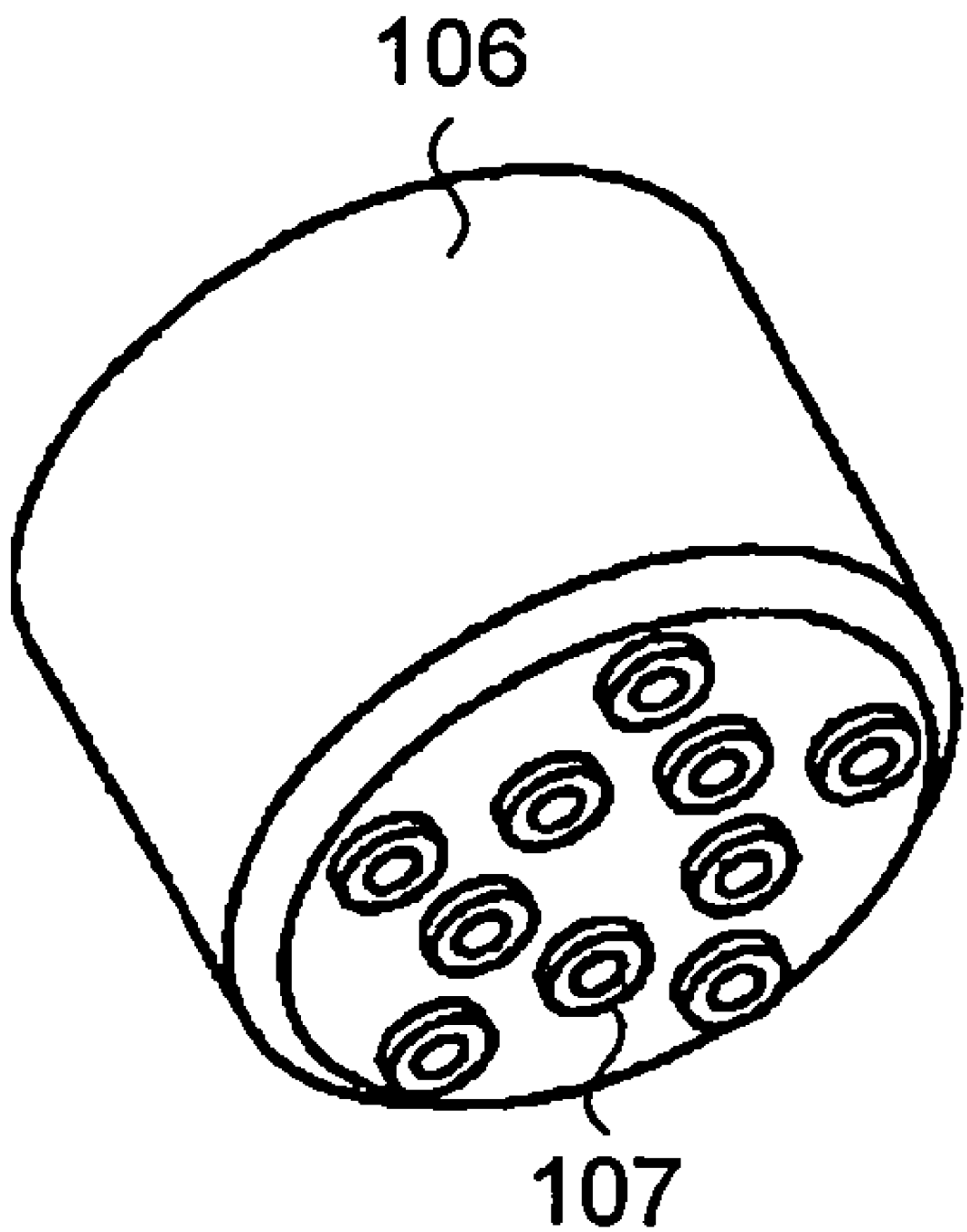
FIG. 4 is an isometric view of the nozzle cap shown in FIGS. 1 to 3.

For example, base beverage type can include coffee or tea, size can include small/medium/large/x-large, and modifiers can include cappuccino and latte. As one of skill in the art can appreciate, there are a multitude of different combinations of beverage base types, sizes and modifiers for which a different volume of concentrated flavouring is required. The suitable amount of concentrated flavouring is optimized for every combination to satisfy customers. Nozzle cap 106 extends from the cabinet to visually cue the operator or customer of the proper position for placement of a container. As will be shown later, nozzle cap 106 includes a plurality of individual channels in a close-packed configuration for dispensing a corresponding fluid. Ideally, nozzle cap 106 is no larger than the mouth of a typical mug to ensure that the mug is correctly placed to receive fluid from any of the nozzle cap channels. Further details of nozzle cap 106 are shown in FIG. 4. As will be described later, user interface 110 and display 114 can be used to re-program dispensing volumes. Those of skill in the art will appreciate that dispensing machines can be configured to have any number of category of variables, and any number of choices within each category of variables.

To operate dispensing machine 100, a user places an empty mug under nozzle cap 106 and then enters a selection via user interface 110. A selection can include a combination of size, flavour, base beverage type and modifier choices. Assuming that the selected combination is valid, the appropriate volume of concentrated flavouring is dispensed into the mug. Now the mug can be filled with the desired base beverage, such as coffee or hot chocolate. Although this sequence is preferred for maximizing mixing of the concentrated flavouring with the base beverage, one can add the concentrated flavouring to a mug pre-filled with base beverage.

Figure 2:
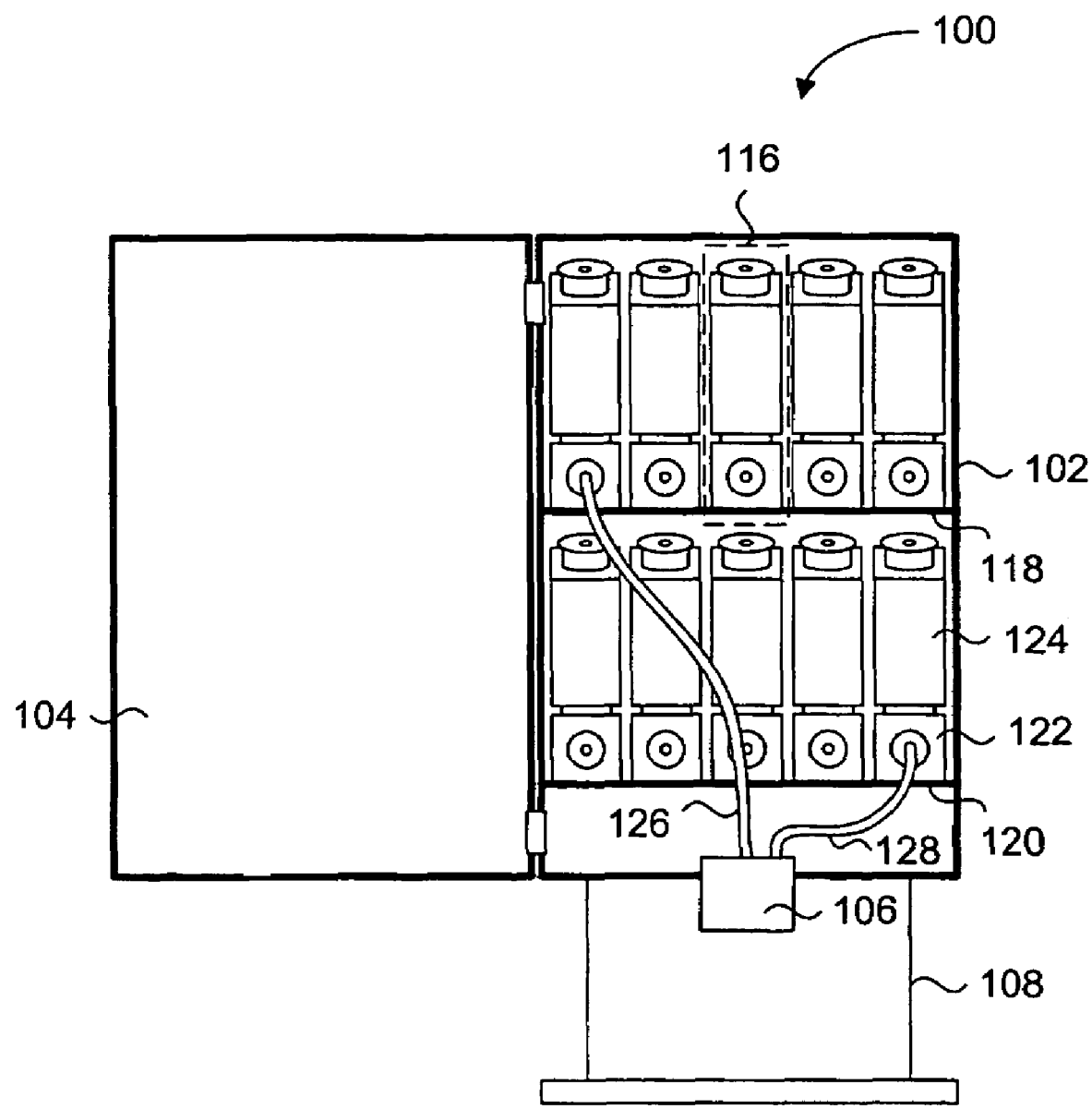
FIG. 2 is a front end view of the dispensing machine of FIG. 1 showing an array of dispensing pumps.

FIG. 2 is a front view of the dispensing machine of FIG. 1 with its door panel 104 open to show the arrangement of the components housed by cabinet 102. FIG. 2 shows ten pump assemblies 116 arrayed as two stacked rows of five pump assemblies 116. The top row of pump assemblies 116 is mounted to top shelf 118 and the bottom row of pump assemblies 116 is mounted to bottom shelf 120, where both shelves 118 and 120 are slidable upon rails (not shown) mounted to the left and right vertical sides of cabinet 102. This arrangement allows a user to pull out a row to access pump assemblies 116. In the present embodiment, each pump assembly 116 includes a displacement pump 122 and a corresponding storage tank 124. To maximize the packing efficiency of each pump assembly 116 in the row direction, the width of each displacement pump 122 and corresponding storage tank 124 are matched. Further details of the displacement pump 122 and corresponding storage tank 124 will be discussed later. To simplify the figure, only the left-most pump assembly of the top row and the right most pump assembly of the bottom row are shown having their output nozzles coupled to nozzle cap 106 via flexible tubes 126 and 128. More specifically, flexible tubes 126 and 128 are connected to respective individual channels of nozzle cap 106, and a person of skill in the art will understand that in the present configuration, nozzle cap 106 includes ten individual channels. While the present example of FIG. 2 shows a dispensing machine 100 configured for dispensing up to ten concentrated flavourings, alternate dispensing machines configured for dispensing more or less concentrated flavourings can be realized by scaling the number of pump assemblies and the number of channels in nozzle cap 106.

Figure 3:
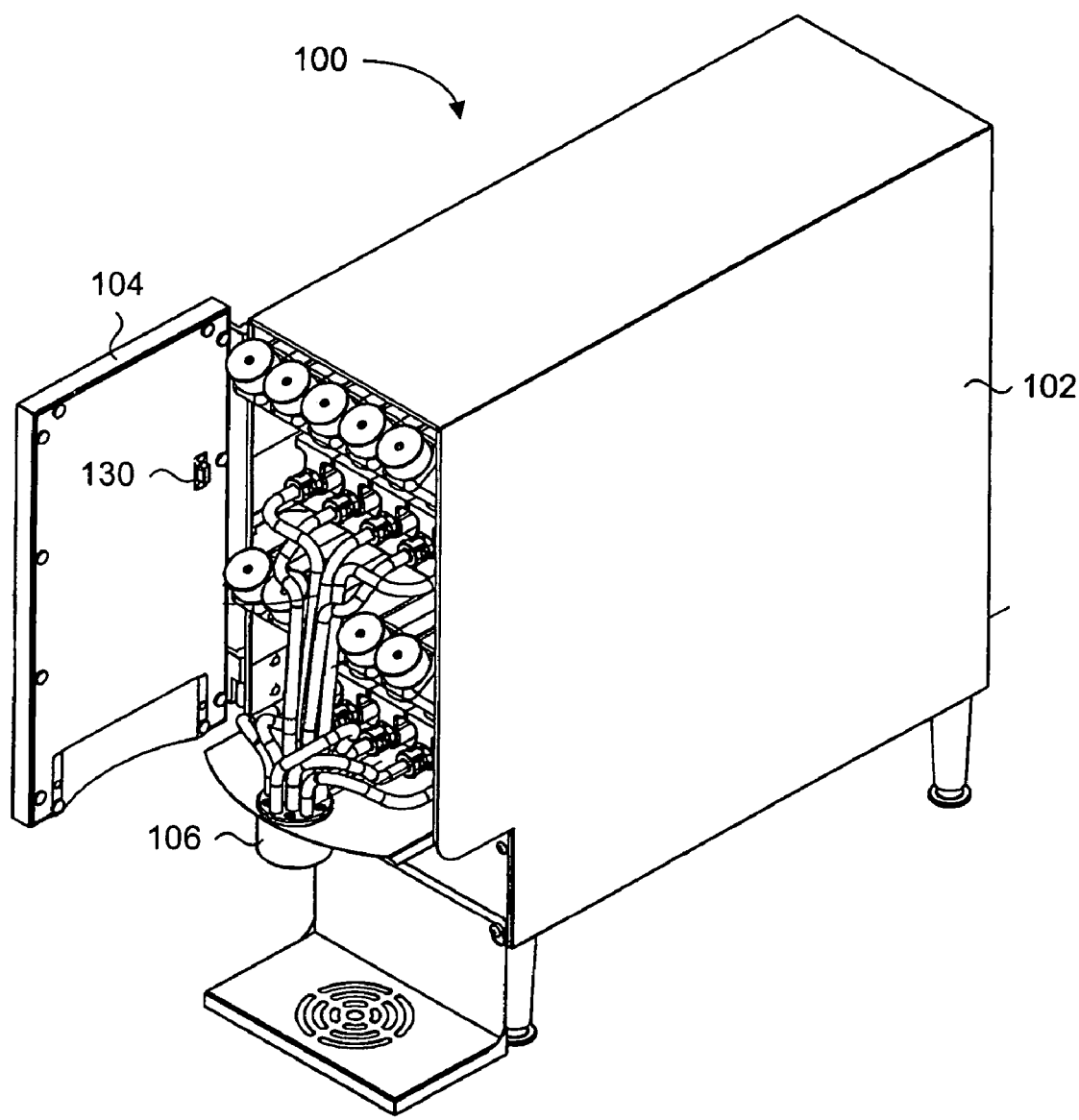
FIG. 3 is an isometric view of the dispensing machine of FIG. 2.

FIG. 3 is an isometric view of a dispensing machine 100 according to an embodiment of the present invention, to illustrate the relative dimensions of the cabinet 102 and to illustrate the interconnection of flexible tubes between nozzle cap 106 and each displacement pump 122. The top shelf 118 and bottom shelf 120 have been partially pulled out to expose parts of the pump assemblies 116. In this particular example, the middle pump assembly 116 of the bottom row does not have a storage tank coupled to its displacement pump, and has instead another flexible tube coupled to an external storage tank (not shown) for supplying a high consumption product, such as liquid sugar, to its corresponding displacement pump 122. In the presently illustrated embodiment, the inside face of door panel 104 includes a communication port 130 for programming dispense volumes, combination dispenses, or other sequences that are too cumbersome to set manually through the user interface 110 on the front of door panel 104. Further details of this feature will be discussed later. While not shown in the figures, the inside face of door panel 104 can also include separate buttons for direct execution of clean and prime cycle operations, which will be described in further detail later.

FIG. 4 shows an isometric view of the nozzle cap 106 shown in FIGS. 1 to 3. In the present embodiment, nozzle cap 106 includes ten individual channels that run through its length, that are coupled to a respective flexible tube 126/128. Each channel aperture 107 includes a raised platform that serves to isolate residual concentrated flavouring fluids from one another, and hence prevent cross-contamination of flavourings between the channel apertures 107. Preferably, the channels are dimensioned to be of a smaller diameter than the diameter of the flexible tubes 126/128, such that the surface tension of the fluid within the channels limits dripping after a dispense operation.

Figure 5:
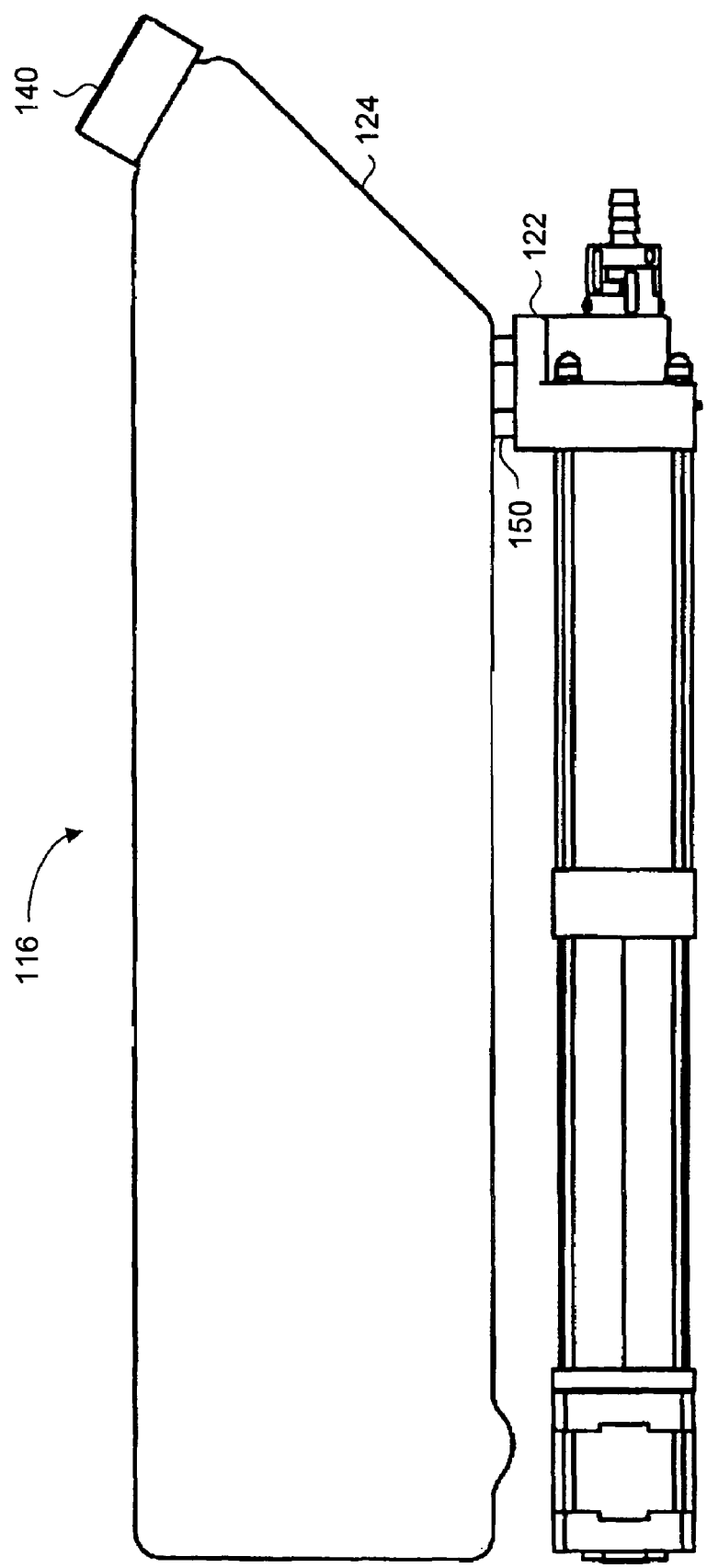
FIG. 5 is a side view of a displacement pump and tank system according to an embodiment of the present invention.

FIG. 5 is a side view of a pump assembly 116 to illustrate the configuration of the displacement pump 122 and its corresponding storage tank 124. Storage tank 124 can be constructed of molded plastic material, metal, or any suitable liquid impermeable material, for storing concentrated flavouring fluid. The storage tank is preferably constructed of a rigid material. The tank is filled by removing tank cap 140 and pouring concentrated flavouring fluid into the open aperture (not shown). The stored concentrated flavouring fluid is provided to displacement pump 122 through a short tank nozzle in fluid communication with the storage tank 124 that extends from the bottom of storage tank 124 and into a check valve retainer 150. The short tank nozzle is preferably constructed of the same material as the storage tank 124, and preferably provided in the same die mold as the storage tank 124. The purpose of having the storage tank 124 directly coupled to the pump is to eliminate the use of flexible tubes to carry fluid from the storage tank 124 to the displacement pump 122. While flexible tubes can be used to carry low centepoise fluids, flexible tubes can collapse under the vaccum created by a combination of the high viscosity of the fluid and rate at which the pump is trying to load its chamber. Therefore a short, rigid fluid line is preferred for supplying high centepoise fluids to the displacement pump 122. Tank cap 140 preferably includes an O-ring and a one way check valve to allow entry of air into the volume of the storage tank 124 as concentrated fluid is drawn, but prevents vapours from escaping and potentially contaminating flavours stored in the other storage tanks 124. Those of skill in the art will understand that air should be allowed to enter the storage tank as fluid is withdrawn to prevent a vacuum from forming and inhibiting further dispensing of fluid.

Following is a general description of the displacement pump 122 shown in FIG. 5. Displacement pump 122 functions analogously to a syringe, and includes a piston slidingly engaged within a chamber for loading, or filling, the chamber with fluid from the storage tank 124 as the piston is withdrawn from the output nozzle. Fluid in the chamber is dispensed as the piston is advanced towards the output nozzle. The distance travelled by the piston is precisely controlled to dispense small and accurate amounts of concentrated flavouring fluid.

The displacement pump 122 according to an embodiment of the present invention can dispense fluids having a wide range of centepoise values, from 1 to 4000 centepoise for example, and can dispense any of these fluids within a wide range of volumes. More significantly, these fluids can be dispensed at very small volumes, such as one millilitre or a fraction thereof, for example, with high repeatability and accuracy. Furthermore, the presently described displacement pump is designed for high reliability operation and to meet minimum National Sanitary Foundation (NSF) hygiene standards. Those of skill in the art will understand that the presence of any potentially harmful bacteria on the components of the displacement pump is undesirable especially if the fluid comes into contact with the bacteria laden components.

Figure 6:
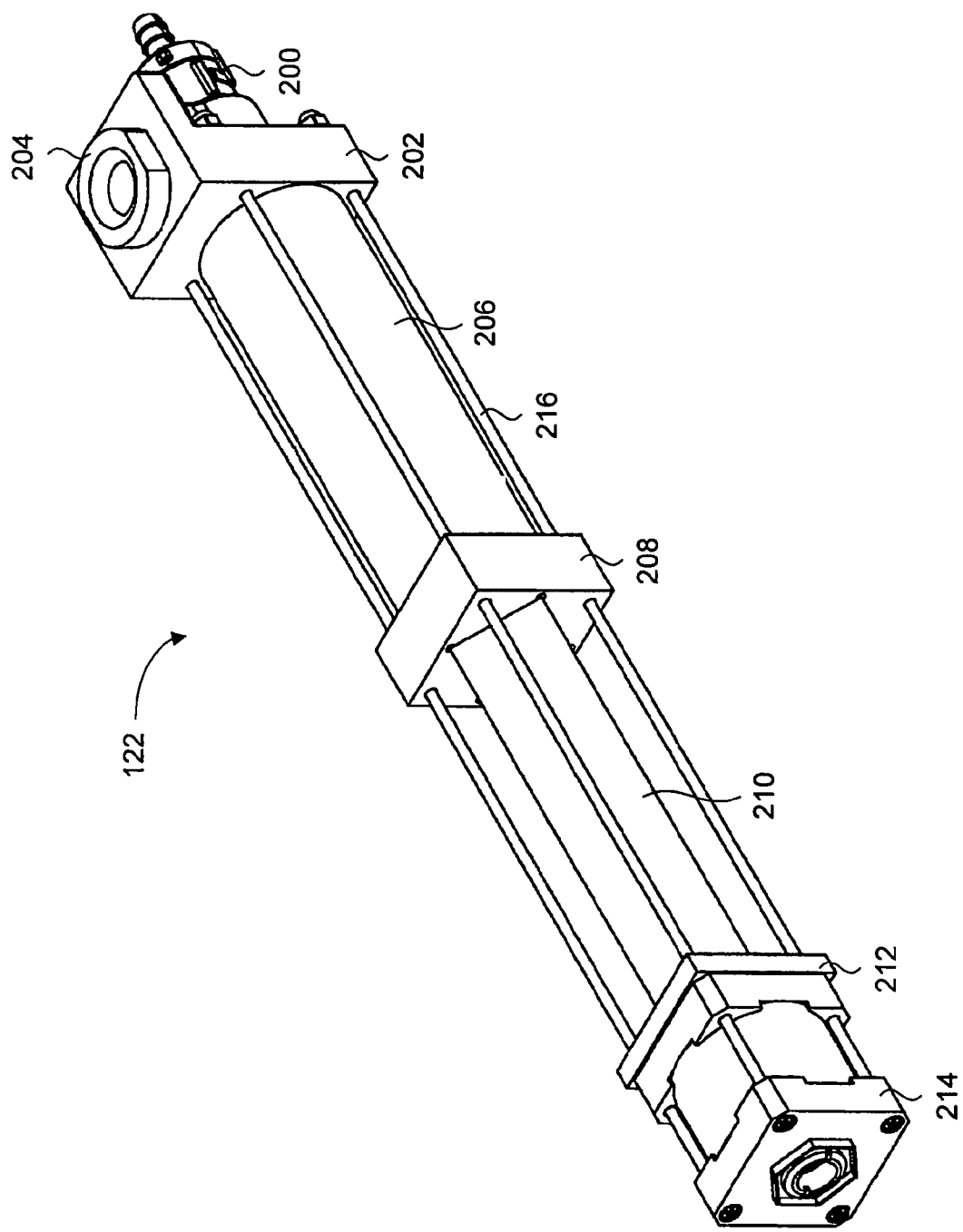
FIG. 6 is an isometric view of the displacement pump shown in FIG. 5.
Figure 7:
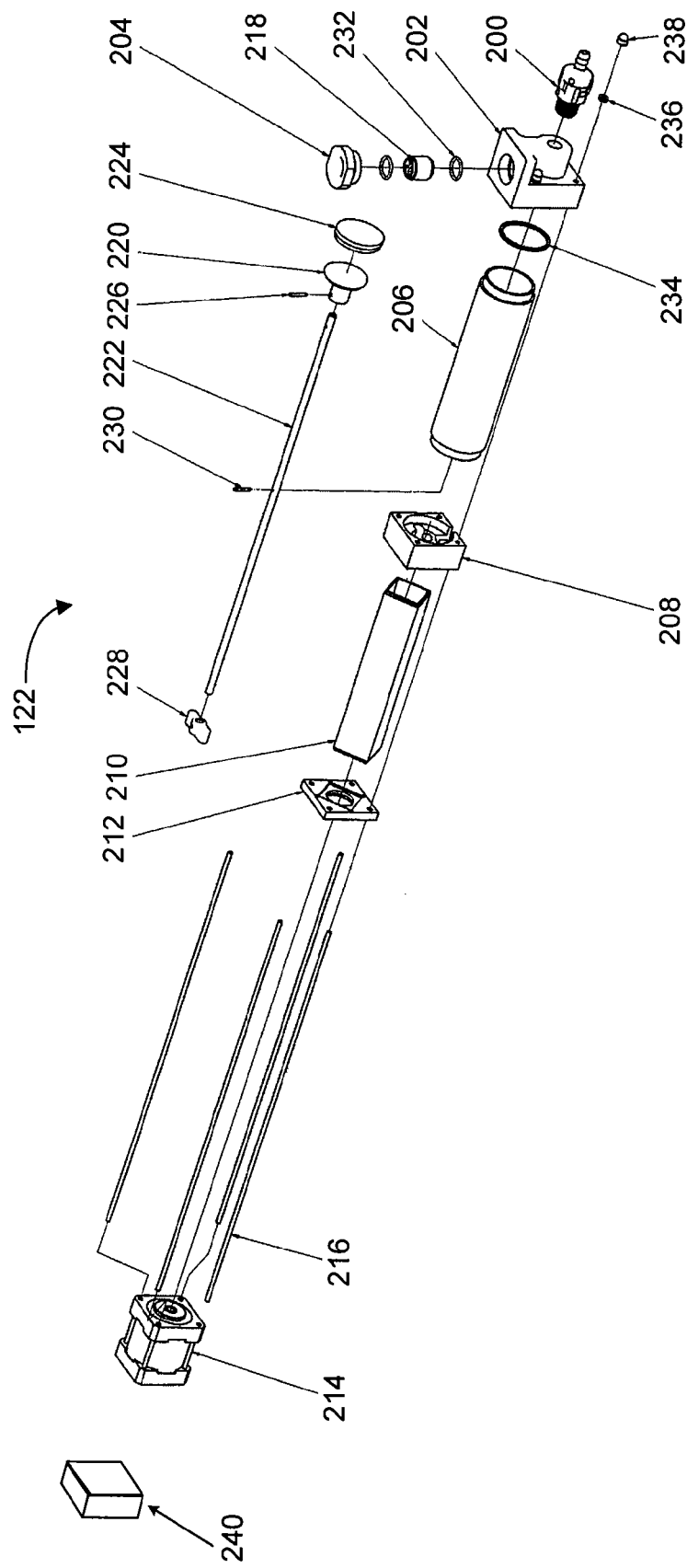
FIG. 7 is an exploded isometric view of the displacement pump shown in FIG. 6.

A detailed description of the displacement pump 122 according to an embodiment of the present invention follows. FIGS. 6 and 7 show an assembled and an exploded view of the displacement pump 122 respectively, shown in FIG. 5. In FIG. 6, displacement pump 122 is shown has having an output nozzle assembly 200, a cylinder front flange 202, a check valve retainer 204, a cylinder tube chamber 206, a cylinder rear flange 208, a guide tube 210, a guide tube flange 212, a stepper motor 214, and threaded rods 216.

Output nozzle assembly 200 includes a standard hose adaptor and one way check valve to prevent fluid in the tube from back flowing into the cylinder tube chamber 206 during a loading operation. Output nozzle assembly 200 can be sealingly mounted to cylinder front flange 202 through a variety of known methods. All the check valves mentioned thus far are commercially available from manufacturers such as the Smart Products. As described for FIGS. 2 and 3, one end of a flexible tube is connected to output nozzle assembly 200 shown in FIG. 6 and the other end is connected to nozzle cap 106.

Cylinder front flange 202 includes an outlet channel (not shown) to communicate fluid between the output nozzle assembly 200 and the cylinder tube chamber 206, and an inlet channel (not shown) to communicate fluid between the storage tank 124 and cylinder tube chamber 206. The inlet channel is dimensioned to receive a one way check valve 218 (shown in FIG. 7) that is retained in the channel by check valve retainer 204. Check valve 218 prevents fluid in cylinder tube chamber 206 from flowing into storage tank 124 during a dispensing operation. While not shown, a face of cylinder front flange 202 includes a recessed portion for receiving and sealing cylinder tube chamber 206.

Cylinder tube chamber 206 is preferably constructed of a thermoplastic material, such as acrylic, such that its interior surface can be made to be as uniform as possible to maximize the seal to the contact edge of piston 220 (shown in FIG. 7) and thus minimize leakage. Various methods of constructing cylinder tube chamber 206 are known in the art. Examples include extrusion, molding and machining. Alternatively, the cylinder tube chamber 206, and in particular its interior surface can be manufactured with lower tolerance and then coated with Teflon™ or other similar compositions. Of course, those of skill in the art will understand that the thickness of the coating may be varied to obtain the desired dimensions of the interior surface. Cylinder tube chamber 206 receives a corresponding sized piston 220, which travels in the direction of the axis of cylinder tube chamber 206 to load and dispense fluid. The length and diameter of the cylinder tube chamber 206 is selected based on an optimal desired accuracy level and maximum volume of fluid to be dispensed in one full stroke. Those of skill in the art will understand that higher dispensing accuracy is obtained by reducing the diameter of cylinder tube chamber 206. Furthermore, the same force behind piston 220 can push a higher viscosity fluid if the diameter of the cylinder tube chamber is reduced.

Cylinder rear flange 208 serves as a coupling between cylinder tube chamber 206 and guide tube 210 to maintain proper alignment there between. Accordingly, one face of cylinder rear flange 208 includes a recessed portion shaped to receive an end of cylinder tube chamber 206, and the opposite face of cylinder rear flange 208 includes a recessed portion shaped to receive an end of guide tube 210. Cylinder rear flange 208 can be constructed of thermoplastic material, or any suitable rigid material. Alternatively, cylinder rear flange 208 is not required in alternate embodiments where cylinder tube chamber 206 and guide tube 210 are constructed as a unitary component.

Guide tube 210 has a square cross-sectional shape in the present embodiment, and can be constructed with any thermoplastic material. The selected length of guide tube 210 is preferably at least the length of threaded drive rod 222 exposed to the interior of cylinder tube chamber 206, for reasons that will be described later. Guide tube 210 in combination with rod guide 228 provides an anti-rotation mechanism for threaded drive rod 222, as will be described later.

Guide tube flange 212 is a coupling between guide tube 210 and stepper motor 214, and includes a recessed portion shaped to receive an end of guide tube 210. Its opposite face includes a recessed portion to receive the face of stepper motor 214. Guide tube flange 212 provides proper alignment between guide tube 210 and stepper motor 214, and is preferably fabricated from a material which has a degree of heat resistance to accommodate the operational temperature of the stepper motor 214.

Stepper motor 214 is a commercially available product having a face that mates with guide tube flange 212. Those of skill in the art will understand that stepper motor 214 includes a stator and a rotor that engages rotates a threaded drive rod 222 (shown in FIG. 7) in a worm gear relationship to translate rotational movement of the rotor into linear motion of the threaded drive rod 222. Therefore, the threaded drive rod 222 is advanced or withdrawn depending on the clockwise or counter-clockwise rotation of the rotor. Stepper motor operation is well known to persons of skill in the art. Generally, the stepper motor rotates by predetermined step sizes in response to electrical input signals. Hence, the travel distance of a drive rod having a known thread pattern can easily be determined and controlled.

To assemble displacement pump 122, cylinder front flange 202, cylinder tube chamber 206, cylinder rear flange 208, guide tube 210, guide tube flange 212 and stepper motor 214 are mated to each other and held in compression to a specified torque amount to guarantee alignment by the four threaded rods 216 that extend through respective through holes in cylinder front flange 202, cylinder rear flange 208, guide tube flange 212 and stepper motor 214. Alternately, those of skill in the art will understand that any number of these components can be integrated together as a single unit, and other means can be implemented to maintain proper alignment. Although not shown in FIG. 6, the piston 220 is placed within cylinder tube chamber 206 and its threaded drive rod 222 extends from the piston 220 through to stepper motor 214.

FIG. 7 shows the remaining components of displacement pump 122, and in particular, details of the piston 220 and threaded drive rod 222. Piston 220 is fixed to a piston seal 224 preferably made of Santoprene™ a type of thermoplastic elastomer available from Advanced Elastomer Systems, where the piston seal 224 is dimensioned to sealingly engage the inner surface of cylinder tube chamber 206. Piston seal 224 has a wide contact edge, preferably a width to provide structural/mechanical stability of the edge under load. In the present embodiments, the width of piston seal 224 can be between 2 to 3.5 mm. However, the selection of the width can be based on the desired sealing surface, frictional wear, and force required to drive the piston seal 224. In contrast, a narrow contact edge can bow as the piston seal 224 is advanced, resulting in potential leakage of fluid into the space behind the piston seal 224. Due to the small volumes of fluid to be dispensed, small amounts of leakage can contribute to inaccurate dispenses. In addition to inaccurate dispenses, the aromatic impact of the leaked fluid is undesired, and reliability of the displacement pump may be affected. More specifically, the leaked fluid can come into contact with threaded drive rod 222, rod guide 228 and guide tube 210, which can affect their operation. Unfortunately, rebuild or replacement of the displacement pump is required for correcting this problem. Therefore, the relatively wide contact edge is selected to prevent any bowing of the contact edge during operation, and potential leakage of fluid from cylinder tube chamber 206.

An end of threaded drive rod 222 is fixed to a recess in piston 220 via spring pin 226 that extends through the walls of piston 220 and threaded drive rod 222. Also fixed to threaded drive rod 222 is a rod guide 228. Rod guide 228 slips over threaded drive rod 222 and is fixed by spring pin 230 which extends through the walls of rod guide 228 and threaded drive rod 222. The rod guide 228 is fixed to threaded drive rod 222 at a position such that it only travels within guide tube 210.

Additional components of displacement pump 122 include O-rings, such as O-ring 232 for sealing the interface between one way check valve 218 within cylinder front flange 202, gasket face seal 234 for sealing the interface between cylinder tube chamber 206 and cylinder front flange 202, and nuts 236 and 238 for tightening threaded rods 216 and holding the displacement pump components together in a torqued compression.

As previously mentioned, the displacement pump 222 according to the embodiment of the present invention can dispense high centepoise value fluids at small, discrete volumes. However, the viscosity of such fluids presents a significant load to any drive means for moving the piston 220. Furthermore, the use of a wide contact edge piston seal 224 adds a further frictional load to the drive means. The drive means, consisting of the stepper motor 214 and threaded drive rod 222, provides sufficient power to overcome the loading presented by both the high centepoise fluid and the friction between the piston seal and the cylinder tube chamber 206. Those of skill in the art will understand that for the threaded drive rod 222 to move, it must not rotate such that rotational movement of stepper motor 214 translates into linear motion of the threaded drive rod 222.

Unfortunately, the interface between stepper motor 214 and threaded drive rod 222 can tighten due to the above mentioned loading, resulting in threaded drive rod 222 rotating with stepper motor 214. In such a circumstance, the threaded drive rod 222 may not advance to dispense fluid, even though the stepper motor 214 has been actuated. To prevent any rotation of threaded drive rod 222, the fixed rod guide 228 within guide tube 210 is employed.

Figure 8:
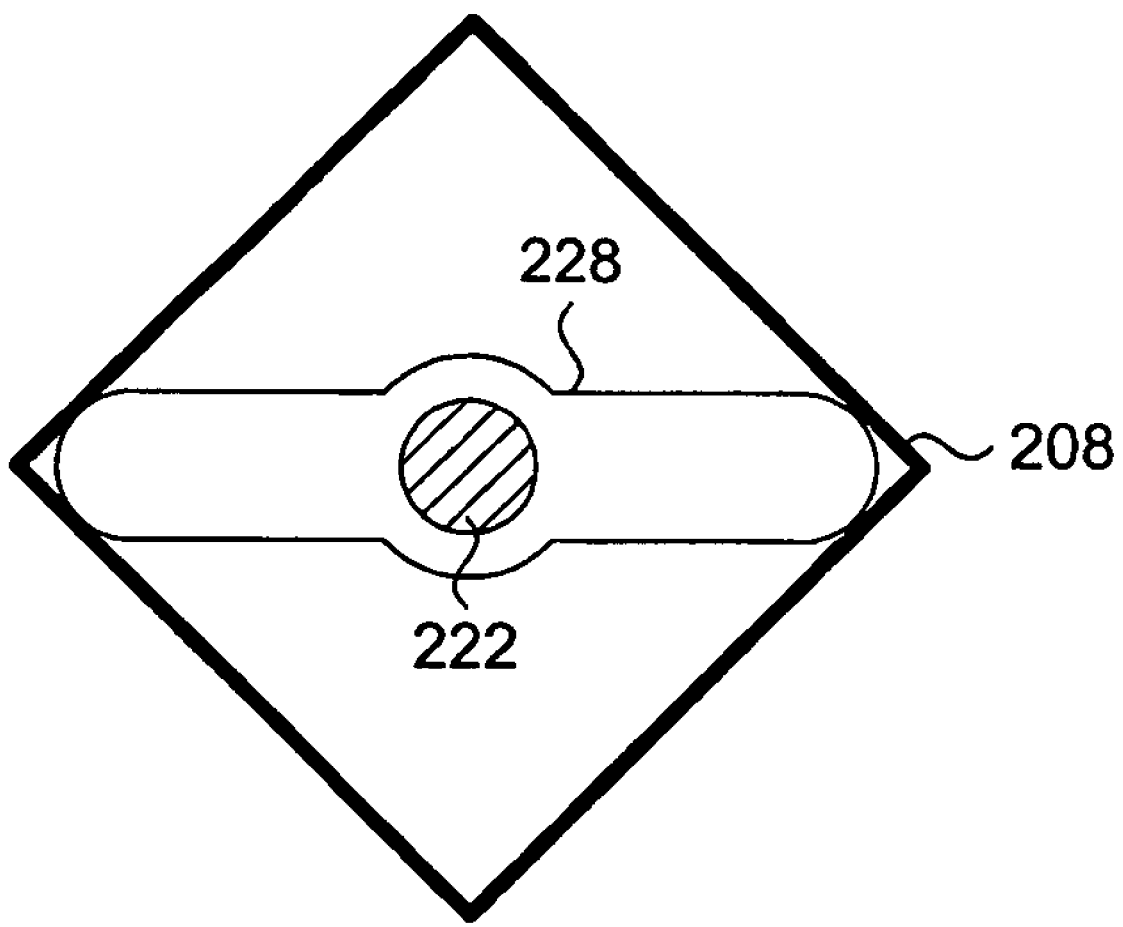
FIG. 8 is a cross sectional view of the guide tube of FIG. 6.

FIG. 8 is a cross sectional view of guide tube 210 along a plane perpendicular to its long axis, showing the disposition of rod guide 228. Since rod guide 228 is fixed to threaded drive rod 222, and the cross-sectional shape of the guide tube 210 prevents rod guide 228 from rotational movement, there is no rotational movement of threaded drive rod 222. Accordingly, as the stepper motor 214 is actuated to rotate, threaded drive rod 222 is limited only to move in a direction parallel to the axis of cylinder tube chamber 206. The threaded drive rod 222 can be of different configurations to optimize speed, torque and accuracy. For example, threaded drive rod 222 can have a 4-start, 10 to 32 thread configuration. Hence displacement pump 122 can be reliably operated to consistently dispense accurate volumes of fluid. Guide tube 210 is not restricted to the square cross-sectional shape shown in FIG. 8, and any suitable shape can be used to mate with the rod guide 228. Alternatively, the shape of rod guide 228 can take any form, as long as the guide tube 210 is correspondingly shaped to restrict its rotational movement.

Since the threads of threaded drive rod 222 are subject to operational wear, it is preferable to keep the threads free from contaminants that could "gum" up the stepper motor 214 and/or degrade the threads themselves. In particular, the direct source of such contaminants are the fluids that are constantly being loaded and dispensed from cylinder tube chamber 206. Therefore, the length of threaded drive rod 222 is selected such that no part of the threaded drive rod 222 that enters the cylinder tube chamber 206 ever comes into contact with stepper motor 214. In otherwords, piston 220 can be fully withdrawn to load the cylinder tube chamber 206, but the portion of threaded drive rod 222 in contact with the interior of cylinder tube chamber 206 will never come into contact with stepper motor 214. In fact, this "contaminated" portion of the threaded drive rod 222 will remain within guide tube 210 so that it is shielded from dust/particulate matter, and prevents any filings or contaminants from entering the volume within cylinder tube chamber 206.

In an alternate embodiment of the present invention, stepper motor 214 can be directly mated to cylinder rear flange 208 to reduce the overall length of displacement pump 116. Such a configuration may be desirable to reduce the footprint of the dispensing machine 100. Indirect cost savings are also realized since less materials for the pump assemblies 116 and the cabinet 102 are required. Since guide tube 210 is no longer used, alternate guide mechanisms should be implemented. For example, the trailing end of threaded drive rod 222 extending from the rear of stepper motor 214 can be engaged with a rail to prevent rotation of threaded drive rod 222.

As previously discussed, the stepper motor 214 of each displacement pump 122 is actuated, or controlled, to advance the piston 220 by a predetermined distance to dispense concentrated flavouring fluid in response to a selection received from user interface 110. Since the dispensing machine 100 includes multiple flavourings, more than one pump can be actuated in response to a particular selection. Since the distance travelled by the piston 220 for each step of stepper motor 214 can be easily determined by persons of skill in the art, the diameter of cylinder tube chamber 206 can be selected to optimize the desired dispense volume/step and dispensing rate of the displacement pump 122. Application of simple geometry and mathematical computations can be used to calibrate the displacement pump 122. These calibrated values can be programmed into a microprocessor that is used to control each of the displacement pumps 122 of the dispensing machine 100.

Figure 9:
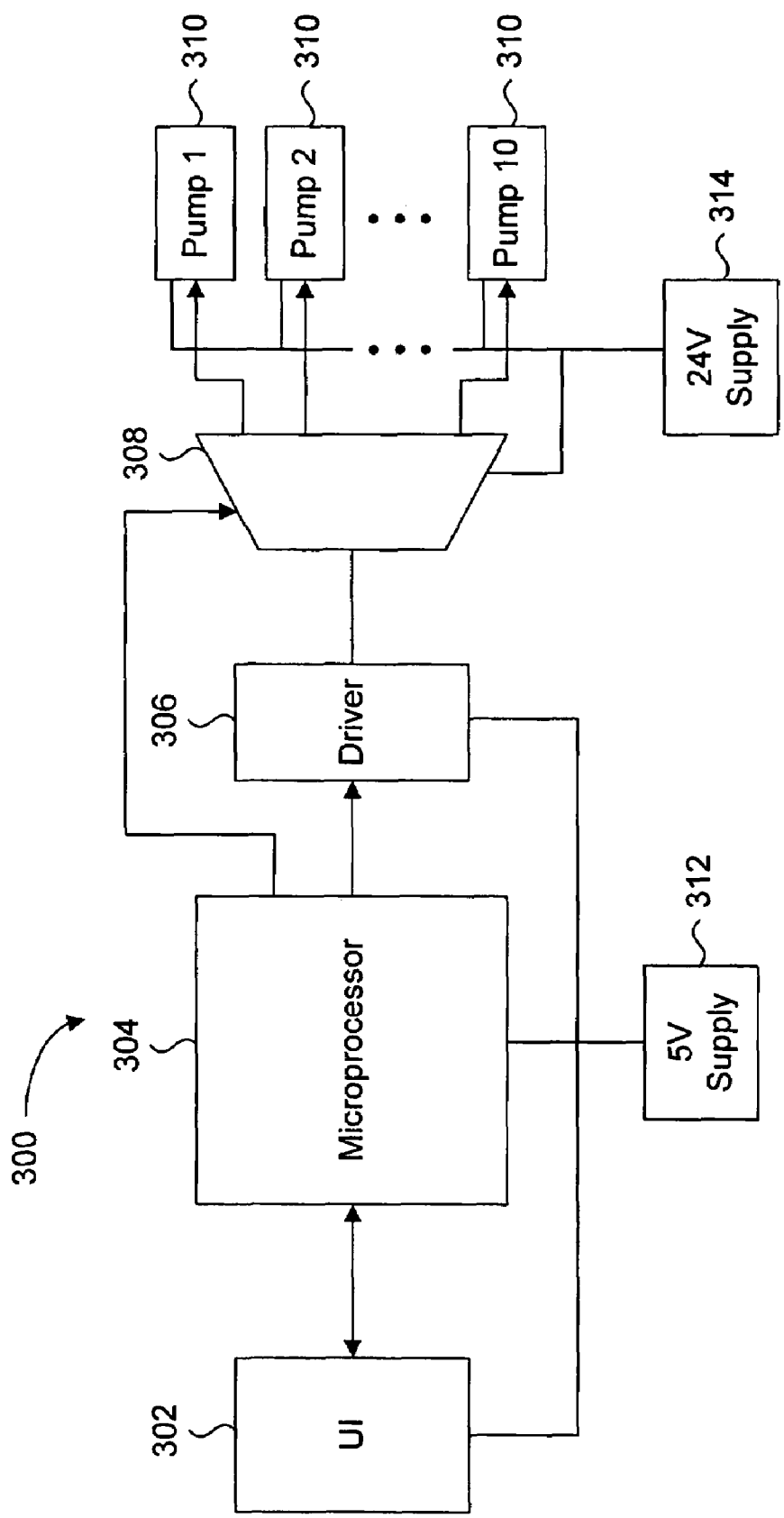
FIG. 9 is a functional block diagram of the dispensing machine of FIG. 1.

FIG. 9 is a block diagram representing the functional components of dispensing machine 100 shown in FIGS. 1 to 3. In addition to the already described components of dispensing machine 100, FIG. 9 shows the electronic systems that control them. Dispensing system 300 includes user interface 110, microprocessor 304, pump driver 306, relay system 308, displacement pumps 310, 5 volt power supply 312 and 24 volt power supply 314.

User interface 110 includes button actuators of the capacitive or piezoelectric sensor type, for sending electrical selection signals to microprocessor 304, and LCD driver circuitry for receiving predetermined display data from microprocessor 304. LCD driver circuitry drives an LCD display with alpha-numeric characters for providing user feedback.

Microprocessor 304 is preferably programmable to permit the manufacturer to install pre-set control algorithms and displacement pump control data for all valid selection combinations. An example of a suitable microprocessor is the Motorola MC68HC908AB32 with non-volatile Flash memory. It should be noted that different retailers may use different types of concentrated flavourings, and hence the volume to dispense per fixed beverage size may differ. Microprocessor 304 receives the electrical selection signals from the user interface 110 for accessing the programmed displacement pump calibration data and calculating the necessary volume to dispense. Once calculated, microprocessor 304 can issue corresponding pump control data, which can include the specific displacement pump 310 to be actuated and the quantity of concentrated fluid to be dispensed from it.

As previously mentioned, the user can manually adjust the existing programming through the user interface. However, the sheer number of possible combinations renders manual programming cumbersome and time consuming. In the present ten flavour embodiment of the dispensing machine 100, there are greater than 700 possible adjustments that can be made. To facilitate mass re-programming or updates to the factory pre-set programming, a communication port can be coupled to the microprocessor. The communication port can be a wired port, such as an RS-232 or USB port that can be connected to a laptop computer or PDA for providing the new programming. Alternatively, a wireless port, such as an IR port, WiFi or Bluetooth transmitter/receiver can be used. Those of skill in the art will understand how to interface such communication ports with microprocessor 304.

The programmability of microprocessor 304 also permits tracking of remaining concentrated flavouring fluid in the storage tanks 124 coupled to each displacement pump 310. Since the volume of each dispense is known, and the full level volume of the storage tank 124 is known, the microprocessor can store a current remaining volume of concentrated fluid so that a visual and/or audio alert is emitted once a predetermined empty level threshold is reached. Of course, a low level indication can be provided when the remaining volume of concentrated fluid has reached a predetermined level. This alert can signal the user to refill the tank, and optionally locks out the specific flavouring from being dispensed. Microprocessor 304 can be programmed to execute maintenance routines, such as a clean cycle to empty the storage tanks 124 and then rinse, clean and sanitize the storage tanks and displacement pumps, and a prime cycle to load and prepare the displacement pumps for initial use. Those of skill in the art will understand that the storage tanks can be filled with cleaning solution that can then be flushed through the system.

Microprocessor 304 can be further programmed to provide timed events. In particular, certain concentrated flavourings may have a limited shelf life, thus necessitating a purge of the stored flavouring after a predetermined span of time, such as 1 month for example. For example, the microprocessor 304 can provide a monthly cleaning warning 24 hours prior to the expiration of the one month period, and then lockout the dispensing machine upon expiration of the one month period. An executed clean cycle would then reset the associated timers.

Pump driver 306 is the circuit responsible for actuating one displacement pump 310. More specifically, pump driver 306 provides motor drive signals, such as direction of rotation and step signals to turn stepper motor 214 of displacement pump 310. Accordingly, the number of pre-calibrated steps corresponds to the desired quantity of concentrated fluid to be dispensed. Additionally, due to the high viscosity of 4000 centepoise fluids, the speed at which the stepper motor 214 rotates is optimized to ensure that no vacuum pockets are formed in cylinder tube chamber 206 as the piston 220 is withdrawn and that an overpressure condition does not occur during the dispense stroke, causing the stepper motor to skip or the check valve to be damaged. Vacuum pockets/voids or overpressure are detrimental to the operation of displacement pump 310 since an increased pressure differential between the cylinder tube chamber 206 and the output nozzle assembly 200 can cause the one way check valve in output nozzle assembly 200 to fail. Hence standing fluid in the flexible tube 126/128, as well as air, can be drawn into cylinder tube chamber 206, throwing off subsequent dispense volumes and tracking of stored flavouring fluid. Those of skill in the art will understand that different pump assemblies 116 in the same dispensing machine 100 can be programmed to step at different rates. For example, one pump assembly 116 can dispense 4000 centepoise fluids while another can dispense two centepoise fluids. Hence the speed, torque and accuracy for each stepper motor 214 could be optimized for maximum performance and reliability.

Relay system 308 multiplexes the direction of rotation and step data from the pump driver 306 to one of the displacement pumps 310. Practically, relay system 308 includes a set of individual relay devices, each individually selectable by microprocessor 304 for coupling the data to the corresponding displacement pump 310. The present system 300 shows a single pump driver 306 shared among ten different displacement pumps 310. This configuration reduces costs since each driver 306 is relatively expensive. Hence, in a combination dispense where multiple concentrated flavours are to be added to a single beverage, each selected displacement pumps 310 is actuated sequentially. Alternatively, dispensing system 300 can include one pump driver 306 dedicated to a corresponding displacement pump 310 for simultaneous actuation of multiple displacement pumps.

Figure 10:
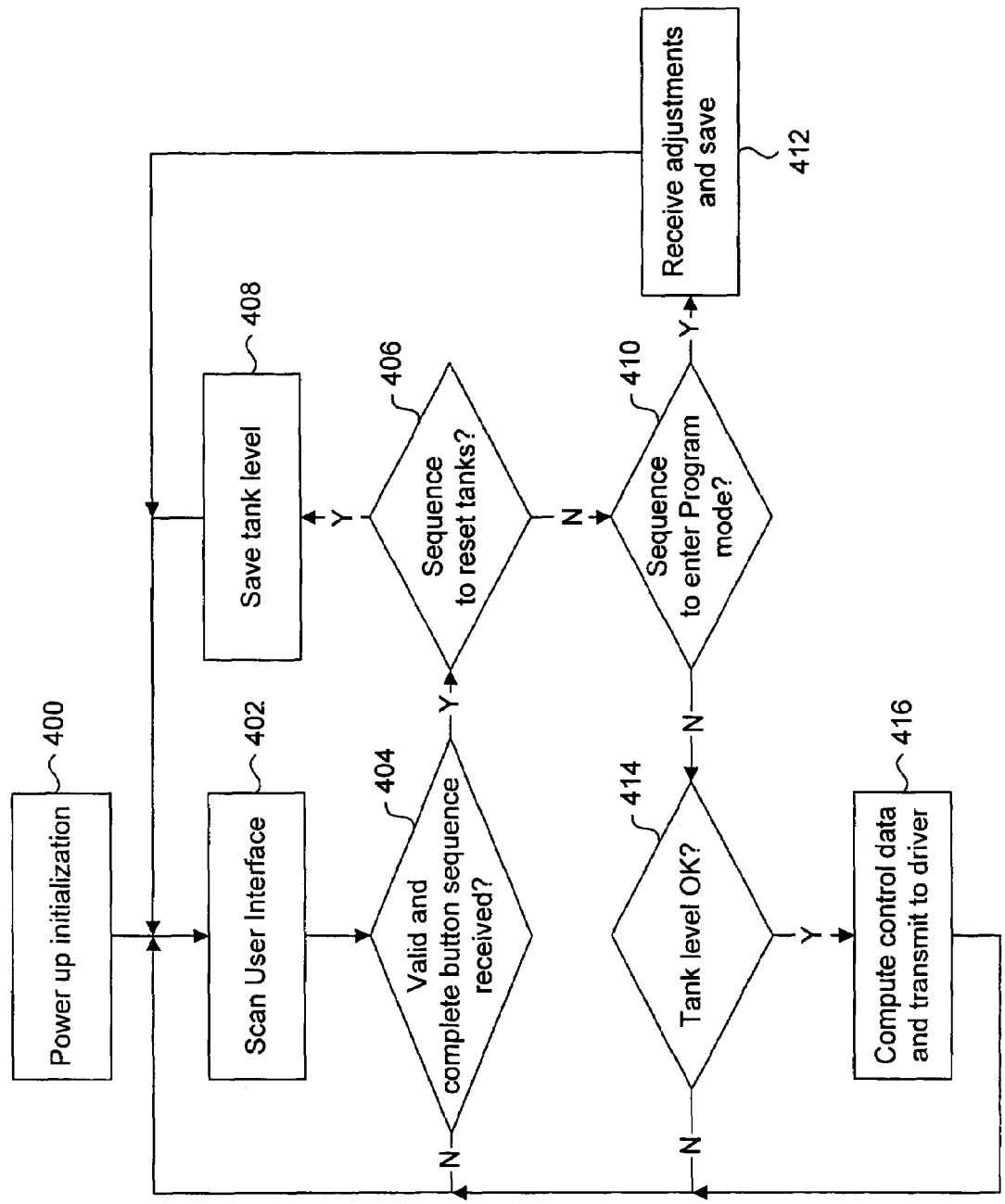
FIG. 10 is a flow chart illustrating operation of the dispensing machine shown in FIG. 9, according to an embodiment of the present invention; and, FIG. 11 is a flow chart illustrating operation of the pump driver shown in FIG. 9.
Figure 11:
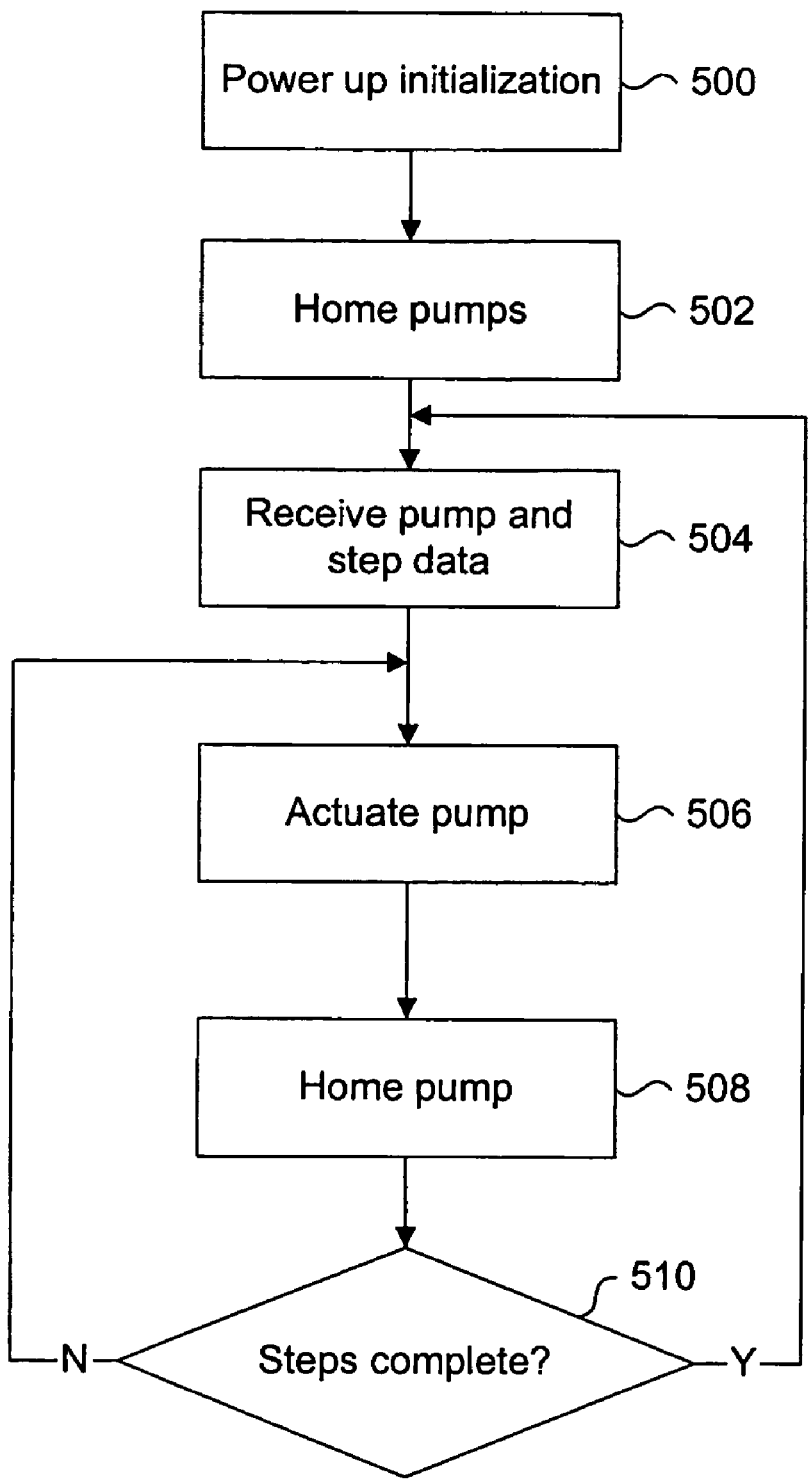

Following is a description of the operation of dispensing system 300 according to an embodiment of the present invention, with reference to the flow charts in FIGS. 10 and 11. The flow chart of FIG. 10 steps through the primary control routine of dispensing system 300 as executed by microprocessor 304, while the flow chart of FIG. 11 steps through a sub-routine executed in tandem by pump driver 306. It is assumed for the present example that all the displacement pumps 310 are ready for dispensing concentrated flavouring fluids.

In FIG. 10, the primary control routine begins at step 400 when the power supplies 312 and 314 of dispensing system 300 are turned on. During the power up initialization of step 400, the microprocessor 304 waits until a synchronization signal is received from pump driver 308 before proceeding to step 402. At step 402, the user interface 110 is scanned for a user selection. Once the selection has been made, the validity of the selection and/or selection sequence is assessed at step 404. It is noted that different retailers may have different pre-programmed combination dispenses, and valid sequence in which the choices from each variable category are entered. If the selection is invalid, then the routine loops back to step 402 and a message can be displayed to the user for indicating the invalidity of the entered selection. Otherwise, the routine proceeds to step 406 to determine if the entered selection corresponds to resetting a storage tank. The storage tank can be first filled to a marked "FULL" level, and then the corresponding selection sequence can be entered to reset the stored level within microprocessor 304. Hence, if the selection sequence indicates that the storage tank has been reset, then the routine resets the stored tank level in step 408, and loops back to step 402. If the selected sequence does not correspond to resetting the tanks, then the routine proceeds to step 410 to determine if the selected sequence corresponds to the program mode. If the program mode is entered, then manual adjustments can be made and saved in step 412, followed by the routine looping back to step 402. These manual adjustments can include setting the dispense volumes and the length of each forward stroke of the piston. Otherwise, at this point, the valid selected sequence is a dispense cycle request, and the routine proceeds to step 414. At step 414, the microprocessor 304 checks the current recorded level of concentrated flavour fluid in the selected storage tank against the empty level threshold value. For example, this empty level threshold value can be set to 200 mL for a storage tank capacity of 900 mL. If the selected storage tank is deemed to be empty, then none of the concentrated fluid is dispensed, and the routine loops back to step 402. A message can be concurrently displayed to indicate to the user that a particular tank needs to be refilled. In the case where a selection sequence corresponds to a combination dispense where several flavour fluids are to be dispensed, the current recorded level of concentrated flavour fluid for each is checked. If any one has reached the empty level threshold, then the combination dispense is cancelled and the appropriate message is displayed.

Otherwise, microprocessor 304 computes the appropriate control data for the selection, actuates the proper relay of relay system 308, and sends the control data to pump driver 306 in step 416. Thus the desired displacement pump 310 is actuated. This control data takes into account the specific flavouring, size of the beverage, type of beverage and any modifiers or other variables that may be relevant to the quantity of concentrated flavouring to dispense. Once the dispense operation for the selection has been completed, the routine loops back to step 402 to receive a new selection. In the case where a combination dispense is executed, the control data is sent sequentially to each displacement pump 310.

The pump driver sub-routine shown in FIG. 11 is now discussed with reference to the primary control routine previously described in FIG. 10. The pump driver sub-routine begins at step 500 when power supply 314 is turned on. This power up initialization step occurs at the same time as the power supply 312 is turned on in step 400 of FIG. 10. All the displacement pumps 310 are immediately "homed" in following step 502, where the home position is set to be the fully withdrawn position of piston 220. It is noted that a sensor 240 can be fixed at a position behind stepper motor 214 to detect when the end of threaded drive rod 222 reaches a position corresponding to piston 220 reaching the fully withdrawn position. This feature effectively re-calibrates the stepper motor 214 in the event that one or more threads on threaded drive rod 222 is skipped as it is being advanced or withdrawn. Many types of sensors, such as electro-mechanical and optical sensors, are known in the art that can be used for this purpose.

Once the pistons of all the stepper motors of displacement pumps 310 have been set to the home position, a synchronization signal is sent back to the microprocessor 304 to allow the primary control routine to begin scanning of the user interface at step 402. In the present embodiment, a synchronization signal is sent every six seconds to maintain an open communications link.

Now the pump driver 306 is ready to receive control data from microprocessor 304 to actuate one or more displacement pumps 310 in response to a selection. Once a valid selection that involves actuation of displacement pumps 310 is made, as determined after steps 404, 406, 410 and 414 of FIG. 10, pump driver 306 then receives the control data provided by microprocessor 304 at step 504. At this point, a particular relay is actuated to select one specific displacement pump 310 so that it can receive drive signals from pump driver 306. The selected displacement pump 310 is actuated by the predetermined number of steps in step 506, and the predetermined volume of concentrated flavouring fluid is dispensed. Depending upon the length and diameter of cylinder tube chamber 206, a partial stroke or one or more full strokes may be required for each dispense operation. At step 508 the actuated displacement pump 310 is homed to re-load its cylinder tube chamber 206, and a determination is made at step 510 if there are any further dispense operations for the present selection. For example, there may be more than one full stroke required for the present dispense operation. Otherwise, the dispense operation for the present user selection is complete, and the sub-routine loops back to step 504 to await further pump and step control data. As previously mentioned, a combination dispense where several concentrated flavours can be dispensed with a single a user selection is possible. Hence, at step 506, each displacement pump 310 is actuated in sequence in response to the control data received in step 504. Once all the selected displacement pumps 310 have been actuated, they are all homed in subsequent step 508. This sequence allows for rapid dispensing of multiple fluids, although each pump can be homed after it has completed its dispense operation in alternate embodiments of the present invention.

Further to the regular dispensing cycles previously described, maintenance routines can be programmed in microprocessor 304 and executed. Two examples of such maintenance routines is a clean cycle and a prime cycle. In the clean cycle, it may be desirable to empty one or more storage tanks 124 as the concentrated flavouring may have a limited shelf life, or if the particular pump assembly is to dispense a new flavour. Since each storage tank 124 is directly connected to its displacement pump 310, they cannot be easily removed without spillage of its contents. Therefore, when the user enters a clean cycle selection from user interface 110, one displacement pump 310 is actuated to drive its piston a full stroke repeatedly until its storage tank is empty. Of course, a container of sufficient capacity should be placed underneath nozzle cap 106 to capture the dispensed fluid. The displacement pump 310 is preferably actuated for a number of cycles sufficient to empty a full storage tank 124, but can be interrupted at any time by the user via user interface 110. Alternatively, several displacement pumps 310 can cycle through a predetermined number of full strokes in the clean cycle. Since a single pump driver 306 is used in the present embodiments, the microprocessor 304 can apply one full stroke to each displacement pump 310 in sequence.

The prime cycle is typically executed after concentrated flavouring fluid has been added to storage tanks 124 following a clean cycle. Since the one way check valves, flexible tubes 126/128 and channels of nozzle cap 106 have air in them following a clean cycle, the prime cycle is necessary to fill them with concentrated flavouring fluid prior to the initial user selected dispense. Thus, the prime cycle is effectively an actuation of the displacement pump 310 by a predetermined stroke length or multiple predetermined stroke lengths sufficient to fill the above mentioned components with concentrated flavouring fluid.

The previously described embodiments of the dispensing machine can dispense a multitude of concentrated flavouring fluids in volumes as small as one millilitre or a fraction thereof, with viscosities ranging from 1 to 4000 centepoise. The displacement pumps according to the embodiments of the present invention employed by the dispensing machine for dispensing such concentrated flavouring fluids has been designed to operate reliably and with accuracy, while meeting well known hygiene standards. The programmable microprocessor and user interface allows for efficient use by customers and/or users, by storing pre-programmed displacement pump calibration data, combination dispense sequences and executing specific dispense operations and maintenance routines.

While the presently described embodiments of the present invention can dispense up to 4000 centepoise fluids, even higher centepoise fluids can be dispensed in alternate embodiments by reducing the diameter of the cylindrical chamber. Therefore, the presently described embodiments can be used in alternate applications other than concentrated flavouring fluid dispensing, where small but accurate amounts of fluids with varying viscosities can be consistently and reliably provided.

The presently described embodiments of the present invention can be used to dispense fluids to flavour food products other than coffee, such as ice cream and cold drinks, but is not limited to dispensing consumable food products.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A displacement pump for dispensing a predetermined volume of fluid comprising:
   a cylindrical chamber coupled to a fluid dispensing outlet having a first one-way check valve, the cylindrical chamber defining an internal volume for storing at least the predetermined volume of fluid;
   a fluid inlet coupled to the cylindrical chamber, the fluid inlet including a second one-way check valve;
   a piston slidable in the cylindrical chamber towards the fluid dispensing outlet;
   a threaded drive rod connected to the piston;
   a stepper motor in threaded engagement with the threaded drive rod, the stepper motor rotatable by a number of steps to slide the piston towards the fluid dispensing outlet by a distance corresponding to the predetermined volume;
   a guide tube having one end coupled to the cylindrical chamber and another end coupled to the steeper motor, the guide tube housing a portion of the threaded drive rod for shielding the portion of the threaded drive rod from contaminants, and
   a rod guide fixed to the threaded drive rod and slidable within the guide tube, the rod guide matingly engaging an inner surface of the guide tube to inhibit rotation of the threaded drive rod.

2. The displacement pump according to claim 1, wherein the fluid dispensing outlet and the fluid inlet are integrated within a front flange, the front flange having a recessed portion for receiving the cylindrical chamber.

3. The displacement pump according to claim 1, further including a storage tank having a rigid fluid conduit coupled to the fluid inlet.

4. The displacement pump according to claim 3, wherein the storage tank includes an aperture for receiving fluid, and a tank cap for covering the aperture.

5. The displacement pump according to claim 4, wherein the tank cap is configured for sealing the aperture, the tank cap further including a third one way check valve for allowing entry of air into the storage tank while preventing exit of fluid vapor from the storage tank.

6. The displacement pump according to claim 1, wherein the piston includes a piston seal.

7. The displacement pump according to claim 6, wherein the piston seal includes contact edge having a width to resist bowing.

8. The displacement pump according to claim 1, wherein the guide tube has a length substantially equal to the length of the cylindrical chamber.

9. The displacement pump according to claim 1, wherein the cylindrical chamber is constructed of acrylic.

10. The displacement pump according to claim 1, further including a sensor to detect when the threaded drive rod reaches a fully withdrawn position.

11. A dispensing system for providing a predetermined volume of fluid corresponding to a user selection, comprising:
   a user interface for providing electrical selection signals in response to the user selection;
   a microprocessor for receiving the electrical selection signals and accessing stored displacement pump calibration data in response to the electrical selection signals, the microprocessor calculating the predetermined volume of fluid to dispense corresponding to the electrical selection signals and the stored displacement pump calibration data, for providing pump control data;
   a pump driver for receiving the pump control data and providing motor drive signals; and,
   a displacement pump including
      a cylindrical chamber coupled to a fluid dispensing outlet having a first one-way check valve, the cylindrical chamber defining an internal volume for storing at least the predetermined volume of fluid,
      a fluid inlet coupled to the cylindrical chamber, the fluid inlet including a second one-way check valve,
      a piston slidable in the cylindrical chamber towards the fluid dispensing outlet,
      a threaded drive rod connected to the piston,
      a stepper motor in threaded engagement with the threaded drive rod, the stepper motor rotating in response to the motor drive signals by a number of steps to slide the piston towards the fluid dispensing outlet by a distance corresponding to the predetermined volume of fluid,
      a guide tube having one end coupled to the cylindrical chamber and another end coupled to the stepper motor, the guide tube housing a portion of the threaded drive rod for shielding the portion of the threaded drive rod from contaminants, and
      a rod guide fixed to the threaded drive rod and slidable within the guide tube, the rod guide matingly engaging an inner surface of the guide tube to inhibit rotation of the threaded drive rod.

12. The dispensing system according to claim 11, wherein the user interface includes a button panel for receiving the user selection.

13. The dispensing system according to claim 12, wherein the button panel is arranged to represent categories of variables.

14. The dispensing system according to claim 11, wherein the user interface includes an LCD panel.

15. The dispensing system according to claim 11, wherein user interface includes a communication port for receiving programming data.

16. The dispensing system according to claim 15, wherein the communication port includes a wired port.

17. The dispensing system according to claim 15, wherein the communication port includes a wireless port.

18. The dispensing system according to claim 11, further including a plurality of displacement pumps, and a relay system for selectively coupling the motor drive signals to one of the plurality of displacement pumps.

19. The dispensing system according to claim 11, wherein each of the plurality of displacement pumps is coupled to a corresponding plurality of storage tanks.

20. The dispensing system according to claim 19, wherein the plurality of displacement pumps and the corresponding plurality of storage tanks are contained within a cabinet.

21. The dispensing system according to claim 20, wherein the fluid dispensing outlet of each of the plurality of displacement pumps is coupled by a flexible tube to a nozzle cap mounted to the cabinet.

22. The dispensing system according to claim 21, wherein the nozzle cap includes a plurality of individual channels, each individual channel being coupled to one of the flexible tubes.

* * * * *